UNITED STATES PATENT OFFICE.

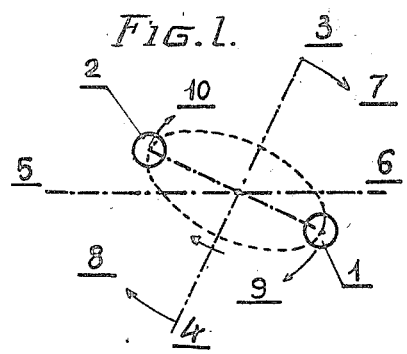
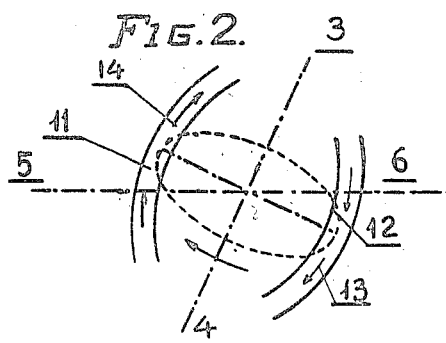
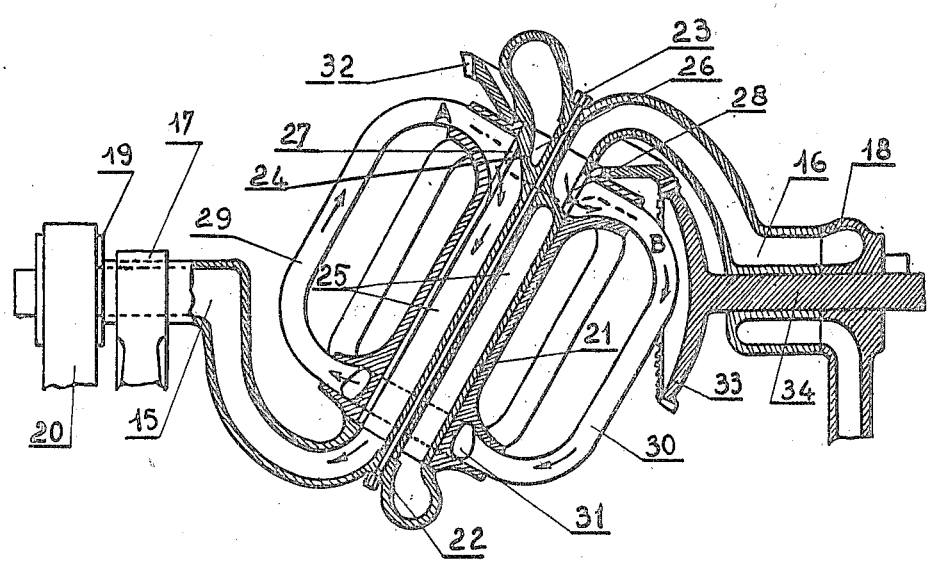
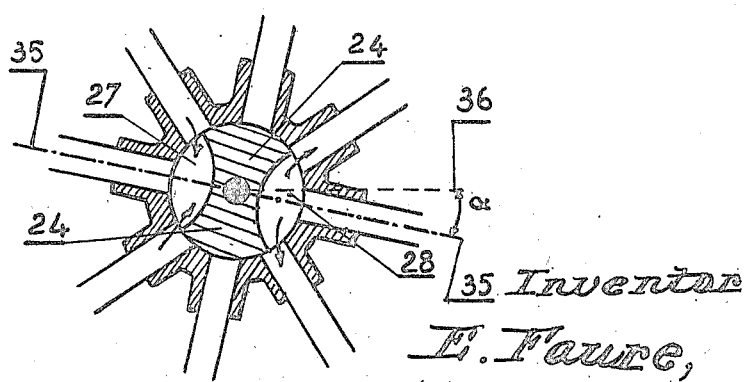

EMIL FAURE, OF PARIS, FRANCE.

NONCENTRIFUGAL INERTIA TURBINE.

1,402,853.   Specification of Letters Patent.   Patented Jan. 10, 1922.

Application filed January 5, 1921. Serial No. 435,293.

*To all whom it may concern:*

Be it known that I, EMIL FAURE, a citizen of the Republic of France, and residing at Paris, France, have invented certain new and useful Improvements in Noncentrifugal Inertia Turbines, (for which I have filed an application in France Oct. 12, 1916,) of which the following is a specification.

Many machines have been conceived to utilize the so-called centrifugal forces due to inertia, called centrifugal machines or turbo-machines; but there are other forces of inertia.

Particularly when a material point 1 (Fig. 1) is actuated in rotation about a first axis of rotation 3—4 and this axis itself rotates about a second axis of suspension 5—6, the following are the forces of inertia which act on said point:

1. A centrifugal force due to the rotation about the first axis of rotation 3—4 and which is exactly the same as if this rotation existed alone.

2. A centrifugal force due to the rotation about the second axis of suspension 5—6, and which is exactly the same as if this rotation existed alone.

3. A supplementary force, which does not exist in the case of a single rotation at constant speed, and which appears in the case of the two rotations. This supplementary force is ordinarily termed "composite centrifugal force." This term is of a character such that it is believed that this force is the result of the two preceding centrifugal forces, but has nothing in common therewith. Hereinafter this supplementary force is called "non-centrifugal force of inertia."

This force may, in the above case of compound rotation, be demonstrated theoretically as follows:—

A gyroscope (Fig. 1) constituted by the bodies 1—2 revolves on an axis of rotation 3—4 which in its turn revolves on an axis of suspension 5—6; it is a well known fact that one of the effects of such rotation is to create a couple 7—8 which tends to cause the two axes 3—4 and 5—6 to coincide, that is to say that when the bodies 1—2 pass into the plane of the two axes the forces of a couple 9—10, parallel to the axis 3—4 and tending to produce the effect in question, are applied to the said bodies.

Consequently, if, in accordance with the invention the pipes 11—12 containing a fluid are caused to revolve on the axis 3—4 (Fig. 2) the molecules of this fluid will be subjected, at the moment when the said pipes pass into the plane of the two axes, to forces 13—14 parallel to the axis 3—4 and in contrary directions as regards each pipe. The result will be pressure in the fluids contained in the pipes 11—12, which pressure will tend to increase in each of them in the direction of the arrows 13 and 14. If, by appropriate devices, the fluid can, at the moment when it passes from the pipes 11—12 into the plane of the two axes 3—4 and 5—6, be conveyed to the ends of these pipes where the pressure is lowest and evacuated from the ends where the pressure is highest, the apparatus will be able to exhaust and compress the fluid. Such circulation causes the liquid to exercise a reaction over the pipes tending to oppose the rotation on the axis 3—4. The work absorbed by this reaction is, moreover, equal to the energy of the liquid under pressure supplied by the apparatus.

Inversely, if, at a desired moment, fluid under pressure in the pipes be impelled in the contrary direction from that indicated by the arrows 13 and 14, the pipes will be caused to revolve on the axis 3—4 and a certain power capable of being utilized will thus be created. It is supposed that the apparatus has been previously set in motion, i. e., caused to rotate on the two axes, the forces in question only developing as a result of such compound rotation. The effect of the impulsion of fluid under pressure will be to maintain the rotation.

The nature of the non-centrifugal forces of inertia which applicant proposes to utilize being thus set forth, it may be stated generally that the invention consists in an apparatus comprising pipes receiving a fluid, coiled around an axis of rotation and subjected to a movement of such a nature that the liquid is subjected to non-centrifugal forces of inertia.

These forces are developed in the case of simple rotation (i. e., around a single axis) at a non-uniform speed, and in the case of compound rotation (i. e., around two axes).

The applicant has shown by analyzing the phenomenon of non-uniform simple rotation or of compound rotation of pipes containing fluid, and by putting it in the form of an equation, that it is exactly comparable to the phenomenon of electro-magnetic induction, if the flow of the liquid in the pipes be compared to an electric current, the difference of pressure between two points of the piping to a difference of potential, and if it be assumed that non-uniform simple rotation or compound rotation creates a field which may be called the gyroscopic field, similar to the magnetic field. The direction of the lines of force of the gyroscopic field at one point will be parallel to the single axis of rotation in the case of non-uniform simple rotation and parallel to the axis of suspension 5—6 in the case of compound rotation.

The term gyroscopic induction may be applied to the phenomenon to correspond with the term electro-magnetic induction.

If a pipe containing a fluid be situated in a gyroscopic field, the action of this field on the fluid is, within the limits of a constant co-efficient, the same as the action of a magnetic field, having the same direction as the gyroscopic field, on a conductor of the same form and position as the pipe.

If, to continue the analogy, the product of the projection from the surface on to a plane perpendicular to the single axis of rotation in the case of non-uniform simple rotation and to the axis of suspension 5—6 in the case of compound rotation, by the angular velocity around the same axis, be called the gyroscopic flux across any given surface, it may be deduced by analogy that in order to obtain a difference of pressure between two points of a spiral-shaped pipe it is necessary to vary the flux passing through the spiral.

To produce this variation in the flux the same means are employed as in electricity, viz.:

1. The intensity of the field is maintained at a constant point and the pipe is caused to move in the field. In practice this signifies that the pipe must be provided with two rotary movements around two non-parallel axes.

2. The intensity of the field itself is varied. This signifies that a simple rotary movement of variable angular velocity is given to the pipe. The simplest movement of this kind is an oscillatory movement.

The phenomena of induction which are produced in the pipes are exactly the same in both cases and there is no difference in principle in the apparatus designed to utilize them.

The mobile part of the apparatus in which the phenomena of induction take place shall hereinafter be called the rotor.

The invention is clearly illustrated in the drawing in which:—

Figs. 1 and 2 are diagrams illustrating the phenomena referred to above.

Fig. 3 is a section of composite rotation devices through the plane of the two axes of rotation and suspension; the arrows indicate the direction in which the liquid is flowing. Fig. 3' is a section of Fig. 3 through the line A—B.

In the compound rotation apparatus shown in Fig. 3, two portions 15—16 are connected by the straight pipe 21 forming the axis of rotation, joined to them by a long bolt 22 and nut 23. The pipe 21 is divided into two chambers by an oblique partition 24. The chamber 25 communicates with the pipe 15 and the chamber 26 with the pipe 16. Each chamber is bored with a hole 27—28 the center of which lies in the plane of the axis of suspension 15—16 and of the axis of rotation 21 which are adopted as the plane of the figure, the two holes being opposite one another at one end of the pipe 21.

The rotor consists of a series of pipes joined together, forming rotor around the axis 21 on which it may revolve freely; the pipes are arranged in opposite pairs, such as 29 and 30 shown in the drawing; they are open at one end on a level with the holes 27 and 28 in the pipe 21, the said pipe thus acting as a distributing cock by which the chambers 25—26 communicate with the pipes 29—30 when the latter pass into the plane of the figure opposite the holes 27—28; all the pipes communicate at the lower end by a pipe 31; the rotor is fitted with a toothed wheel 32 gearing with a pinion 33 carried by a fixed shaft 34.

When used as a pump the apparatus works in the following manner:—

When the suspension shaft 15—16 is set in motion the toothed wheel 32 of the rotor travels along the fixed pinion 33 and causes the rotor to revolve on the axis 21. In consequence of this compound rotation to which the pipes 29—30 are subjected, pressure is developed in the liquid at the moment when the said pipes pass into the plane of the two axes; at the same time communication is effected between the chambers 25—26 of the cock 21 as shown in the drawing and the liquid circulates in the direction of the arrows, being exhausted in 16 and compressed in 15.

In reality the bisecting plane 35 (Fig. 3') of the two holes 27—28 in the cock 21 does not coincide with the plane 36 of the axes of suspension and rotation, but diverges to the extent of an angle $a$ in advance of the rotatory movement according to the pressure and output required.

The apparatus may be used as a driving engine; if, after it has been set in motion, liquid under pressure is sent into it the rotor will continue to revolve on its axis 21 and the pinion 32 acting on the fixed pinion 33 will rotate the shaft 15—16 to which the power developed may be transmitted.

This apparatus is designed so that the total effects of each of the centrifugal forces proper will be zero. In fact, in each closed spiral, having its center at the point of intersection of the two axes of rotation, if we assume two diametrically opposite points we will easily see that the centrifugal forces evolved by the rotation about one or the other shaft, will be neutralized for each rotation. On the contrary, the non-centrifugal forces of inertia acting at two diametrically opposed points of a spiral add their results, as evident from the diagrammatic views of Figs. 1 and 2 and the explanation given above.

Claims:

1. Apparatus comprising a shaft of rotation, a system of spiral pipes rotatably mounted around the said shaft, a shaft of suspension upon which is mounted the shaft or rotation, a means of admitting and discharging the fluid, and devices for utilizing the pressure developed by the non-centrifugal forces of inertia acting on the said fluid.

2. Apparatus comprising a shaft of suspension composed of two hollow portions rotatably mounted and receiving a fluid at one end; a shaft of rotation connecting the two portions of the shaft of suspension and situated in the same plane; a tubular cock joined to the shaft of rotation; an oblique partition dividing this cock into two chambers communicating respectively with the two portions of the suspension shaft; a hole in each of the two chambers situated at the same end of the cock in the neighbourhood of the plane of the shafts of suspension and rotation; a rotor formed by a system of pipes in half spirals rotatably mounted around the tubular cock; openings at the end of the pipes on a level with the holes in the two chambers of the tubular cock; a conduit effecting communication between the other ends of the pipes; a toothed pinion joined to the rotor; a fixed shaft having the same axis as the suspension shaft; and a toothed pinion carried by this fixed shaft, gearing with the pinion of the rotor.

In witness whereof I have hereunto set my hand.

FAURE EMIL.